(12) United States Patent
Brand et al.

(10) Patent No.: US 11,835,199 B2
(45) Date of Patent: *Dec. 5, 2023

(54) METHOD FOR MARKING LUMINAIRES, CONTROLLER ARRANGEMENT AND LUMINAIRE

(71) Applicant: SCHREDER, Brussels (BE)

(72) Inventors: Daniel Brand, Cologne (DE); Jörg Richter, Nordhorn (DE); Helmut Schröder, Wiesbaden (DE); Didier Wellens, Kraainem (BE)

(73) Assignee: SCHREDER, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,897

(22) Filed: Apr. 6, 2020

(65) Prior Publication Data

US 2020/0236764 A1 Jul. 23, 2020

(30) Foreign Application Priority Data

Jan. 5, 2015 (EP) .................... 15150119

(51) Int. Cl.
*G06F 16/00* (2019.01)
*F21S 8/08* (2006.01)
(Continued)

(52) U.S. Cl.
CPC ............ *F21S 8/085* (2013.01); *G06F 16/907* (2019.01); *G06K 7/10861* (2013.01); *H04W 4/021* (2013.01); *H05B 47/19* (2020.01)

(58) Field of Classification Search
CPC ........ H05B 47/19; H05B 47/11; H05B 45/12; H05B 47/175; H05B 47/195; H05B 45/10; H05B 47/165; H05B 47/155; H05B 47/22; H05B 41/36; H05B 47/105; H05B 45/3725; H05B 45/375; H05B 47/16; H05B 45/20; Y02B 20/40; G07F 11/70; G07F 17/02;
(Continued)

(56) References Cited

U.S. PATENT DOCUMENTS

2006/0193125 A1* 8/2006 Fluss ...................... H05B 47/18
362/231
2006/0193133 A1* 8/2006 Von Der Brelie ..... H05B 47/18
362/276
(Continued)

FOREIGN PATENT DOCUMENTS

EP 2533615 A2 12/2012
FR 3001857 A1 8/2014
(Continued)

*Primary Examiner* — Shyue Jiunn Hwa
(74) *Attorney, Agent, or Firm* — BROWDY AND NEIMARK, P.L.L.C.

(57) ABSTRACT

Described herein is a method for marking luminaires, particularly traffic route luminaires, in a luminaire network, the network being controllable via a server. Each luminaire is provided, in its operational state, with a controller (2) for controlling its operation and a mark that is visually recognizable from the outside the luminaire. The mark is formed by an information storage medium (4), in particular, and can be used to identify the luminaire. The mark is linked to the controller (2) or to the luminaire to be controlled by the controller before the mark is added to the luminaire.

16 Claims, 3 Drawing Sheets

Figure 1:
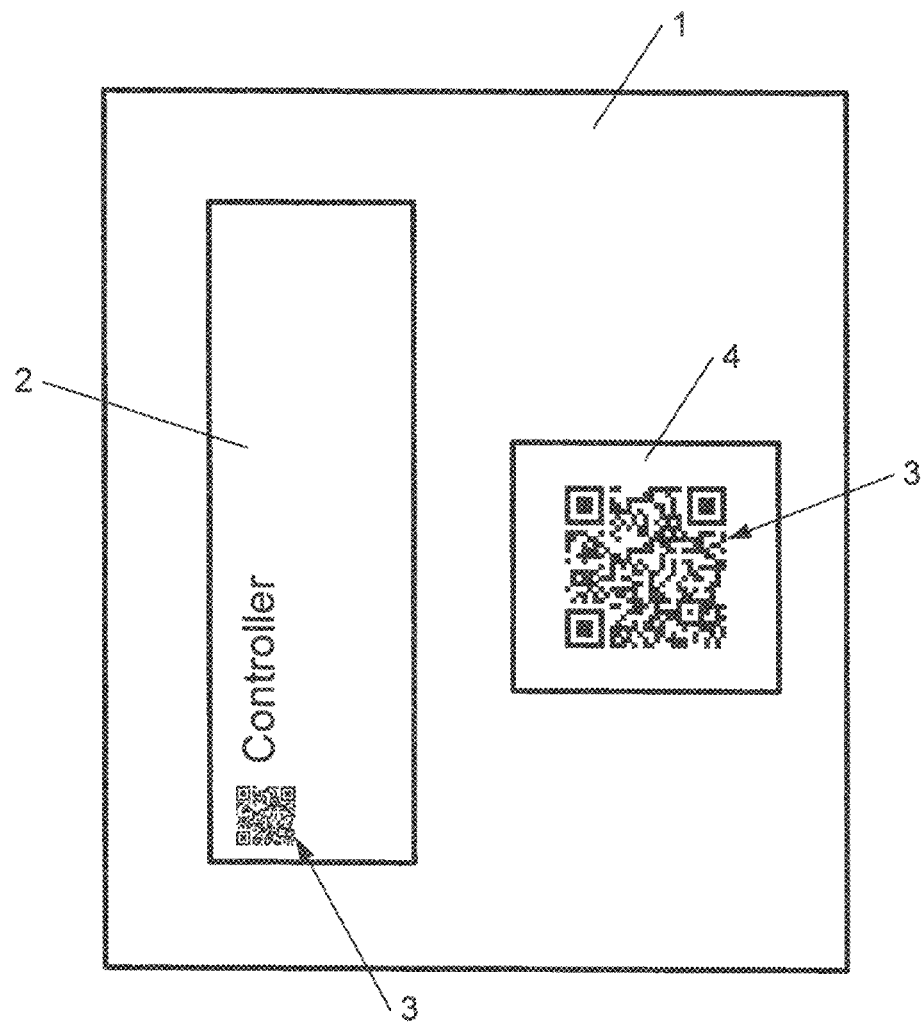

(51) Int. Cl.
*G06F 16/907* (2019.01)
*H05B 47/19* (2020.01)
*G06K 7/10* (2006.01)
*H04W 4/021* (2018.01)

(58) Field of Classification Search
CPC ........ G06F 16/907; G06F 21/33; G06F 21/43; G06F 21/44; G06F 3/165; G06F 30/13; G06F 2205/126; G06F 2212/452; G06F 3/041; G06F 3/04883; G06F 3/0652; G06F 3/0679; G06F 9/30101; G06F 2111/02; G06F 2111/04; G06F 2111/12; G06F 2111/20; G06F 3/0484; G06F 30/00; G06F 30/12; G06F 30/18; G06F 9/451; G06F 16/29; G06F 16/444; G06F 3/00; G06F 5/00; G06F 7/00; G06F 16/26; G06F 18/00; A61J 7/0481; F21K 9/23

See application file for complete search history.

(56) References Cited

U.S. PATENT DOCUMENTS

| | | | |
|---|---|---|---|
| 2007/0057807 A1* | 3/2007 | Walters | H05B 47/22 340/7.29 |
| 2007/0121323 A1 | 5/2007 | Pawlik et al. | |
| 2008/0272586 A1* | 11/2008 | Hick | G09F 3/0288 283/81 |
| 2009/0222223 A1* | 9/2009 | Walters | G01R 31/44 702/58 |
| 2011/0266345 A1 | 11/2011 | Fowler et al. | |
| 2012/0173382 A1 | 7/2012 | Loveland | |
| 2012/0314901 A1* | 12/2012 | Hanson | G08B 21/043 600/595 |
| 2013/0181636 A1 | 7/2013 | Agrawal | |
| 2014/0310948 A1* | 10/2014 | Maxik | G07F 11/70 29/592.1 |
| 2014/0354188 A1 | 12/2014 | Takahashi et al. | |
| 2015/0123563 A1 | 5/2015 | Dahlen | |
| 2015/0163887 A1* | 6/2015 | Kusakari | F21K 9/27 315/291 |
| 2015/0373816 A1 | 12/2015 | Dherbassy | |
| 2016/0088715 A1* | 3/2016 | Nolan | H05B 47/105 607/88 |

FOREIGN PATENT DOCUMENTS

| | | |
|---|---|---|
| JP | 2014-236302 A | 12/2014 |
| WO | 2014126470 A1 | 8/2014 |
| WO | 2014/162279 A1 | 10/2014 |

* cited by examiner

METHOD FOR MARKING LUMINAIRES, CONTROLLER ARRANGEMENT AND LUMINAIRE

The present invention relates to a method for marking luminaires in a luminaire network, particularly of traffic route luminaires, that can be controlled via a server, wherein the luminaires are respectively provided, in the operational state, with a controller for controlling the respective luminaire and the luminaire has a mark that is visually recognizable from the outside, which is formed by an information storage medium, in particular, and that can be used to identify the luminaire.

To date, the installation of luminaires, particularly of traffic route luminaires, either involves the luminaire, for example, a street luminaire, being set up at a particular location or a luminaire that is already in place being equipped with a new controller. In either case, a controller is used for controlling the respective luminaire and is connected or can be connected directly to a long-range communication module or indirectly via one or more further controllers to a server on which a piece of software for controlling the luminaire network runs, for example. These are telemanagement systems of networks with sometimes thousands of luminaires.

The terms "traffic route luminaire" and "traffic route luminaires" are to be understood as referring to a luminaire or luminaires that are installed, not only on streets, but also on cycle paths, pedestrian paths or in pedestrian zones, for example. They may be luminaires that are distanced from the ground by means of a mast, which is anchored in the ground, or that are spread centrally over roadways between and from house facades, for example.

The controller is typically used to actuate a driver, which provides driving current for the illuminants or lighting elements of the luminaires, said illuminants or lighting element more recently being in the form of at least one light-emitting diode (LED) module.

Conventional luminaires have a mark that indicates the location and a mast number, for example, the mark being at a level that can be read by maintenance or installation personnel. Typically, this is a combination of alphanumeric characters according to a scheme that is prescribed by a luminaire network operator. However, there is no link between the mark and the controller and the luminaire within which the luminaire is located.

When a new luminaire has been set up or commissioned, or when a new controller has been integrated into an existing luminaire, it is necessary for the mark to be linked to the luminaire in order to be able to produce an explicit reference at the site of the luminaire, for example. For this purpose, the installation or maintenance personnel will visit the respective luminaires in order, often with an appliance that provides geolocation data, and will match or link the marks to any information that the controller contains and will define the mark as being appropriate.

US-A-2007/0057807 discloses a luminaire network which may be controlled by a server connected to each luminaire manager or controller or group of luminaire managers or controllers. Each luminaire manager or controller is considered to be a node in the luminaire network which can transmit global positioning system (GPS) coordinates to a network control centre, the GPS coordinates being displayed on maps illustrating the locations of the nodes. Each luminaire manager or controller or each enclosure, housing or luminaire has a scannable barcode or mark securely attached thereto for purposes of identification. An identification code can be stored in a memory of each luminaire manager or controller and is written thereto using a personal digital assistant (PDA) hosted field unit.

US-A-2006/0193125 discloses the use of identification (ID) codes which can be stored in a memory associated with a lamp or luminaire. Each ID code forms part of an ordered system or is derived by an algorithm which allows each ID code to be distinguished from any other ID code associated with another lamp or luminaire within a system of lamps or luminaires. A device is required to input the code into the memory associated with the lamp or luminaire in accordance with the ordered system or following the algorithm. Factory applied data set and ID codes are applied before installation and commissioning of each lamp and which are readout so that the luminaire can be recognised from its code.

Whilst the use of ID codes associated with a luminaire component is disclosed in each of the documents above, additional devices are required at the installation site for associating a luminaire component, e.g. a luminaire controller, with its position within a network and there is no automatic linking of the luminaire component with a mark which is readily discernible from outside of the luminaire. This linking is important for the installation and commissioning of new luminaires and for the repair and replacement of components in existing luminaires.

It is an object of the present invention to minimize the outlay for the installation of new or newly setup luminaires.

The object of the present invention is achieved by a method as recited in claim 1 and the subject-matter recited in claims 18 and 24.

The invention achieves the object of the present invention by having the mark linked to the controller or the luminaire controlled by the controller before the mark is added to the luminaire. In this case, the term "linking" is understood to mean the explicit association of the luminaire or of the controller with the mark that is to be added or is added to the luminaire. By way of example, such a link may be an association in the form of a data table that is in place on the server or that can be transmitted to a server for operating the network. The link may also be an association in a corresponding database.

By way of example, said link may be made on the server that can communicate with the controllers for operating the luminaire network. The installation or maintenance personnel is saved an additional work step. In particular, this allows the definition of marks that are provided before a controller is installed for an existing luminaire and are intended to replace an older mark.

Advantageously, the link to the controller may be made at the factory itself, with the term "at the factory", in this case, meaning when the controller is produced or when it is packaged or else when controllers that have already been packaged to some extent are commissioned. In particular, the link is made even before the controller is packaged and transported to the set-up location. This means that the link can be made in automated fashion within the production and packaging path of the controller.

Preferably, the mark is made on the basis of controller-specific data. For this, the controller may have one or more explicit unique identifier(s) (UID(s)) that are linked to the mark or stored behind the mark or corresponds to the mark.

A UID is an identifier code or number that is generally embedded into the hardware of the processor of the controller or is stored in the memory of the controller. A IAD is unique for a particular controller. Based on this unique identifier, the mark on the sticker is derived, either by representing this unique identifier itself or from a code that is uniquely derivable from it.

In particular, an information storage medium that has or forms the corresponding mark is enclosed with the controller before the latter is installed in the luminaire and at an appropriate distance from the set-up location of the luminaire. By way of example, the mark may be a sticker that is enclosed in the packaging and that, when the controller is removed from the packaging and installed, is advantageously affixed to a mast or another portion of the luminaire where it is directly recognizable before or after the controller is installed. The link between the mark and the UIDs is then stored by the server so that, in the event of future queries by the installation personnel at a luminaire, it is possible for the installation personnel to retrieve luminaire-specific or controller-specific information directly.

In particular, the information storage medium can therefore be based on controller specific data so that when the controller transmits this controller specific data to server, the server, at the same time, gets the information on the mark. The controller can also be provided with a geolocalization module providing location and time, e.g. based on a global positioning system (GPS). Additionally, transmitting the location information to the server enables the server (i.e. the telemanagement system) to link the location and the mark with the controller, and, hence, to link the mark with the luminaire.

Against the background of error-free installation, reliable process handling of a link between luminaire and information storage medium is provided when the information storage medium is affixed, and, in particular adhesively bonded, to the controller or the packaging thereof. Thus, when the controller is removed at the set-up location, for example, the associated information storage medium can be peeled away from an adhesive underlay that is affixed to the controller or the packaging and fixed directly to the luminaire.

A future-proof mark for the luminaire is provided by means of an information storage medium that has a QR code as a mark. In this case, maintenance personnel do not need to carry more specialized appliances in which the mark of the luminaire is indicated. Instead, existing mobile telephones or other mobile terminals provided with a camera can be used that are able to recognize the QR code, possibly with the support of a software application.

In particular, a mobile terminal of this kind can be used to communicate with a server that can be reached particularly via the internet, wherein data relating to the mark sensed by or input on the mobile terminal are transmitted to the server and luminaire-specific information is transmitted from the server to the mobile terminal and displayed thereon at least in part. This is advantageous for installation personnel when the status of the luminaire needs to be checked. Similarly, it is possible for residents, for example, to display information pertaining to the luminaire, for example, the switch-on and switch-off times thereof. The mobile terminal may additionally have an input facility, for example, realized by a software application that can be provided by the network operator, which can be used, by linking to the mark, to transmit error information to the server. It is thus possible for not just the installation personnel but also another person who is at the luminaire, who has an appropriate piece of software installed on the mobile terminal, to identify the luminaire, and, by way of example, to use an input panel in the software or app to transmit a piece of information relating to the luminaire to the network operator.

The object presented at the outset is also achieved by a controller arrangement that is suitable for use in a method as described above or in the following, in which an information storage medium, particularly a badge or a sticker, for adding to the luminaire is associated with the controller. This arrangement has the corresponding associated advantages of the method according to the invention that are described above and below.

Advantageously, the controller and information storage medium enclosed therewith are provided with identical, visually perceptible marks. This provides another, additional checking option during the production process in order to make the method as reliable as possible in terms of the process. In particular, the mark may at least to some extent be a QR code.

The object presented at the outset is also achieved with the advantages described above or below as appropriate by a luminaire having a controller arrangement according to the invention.

Figure 3:
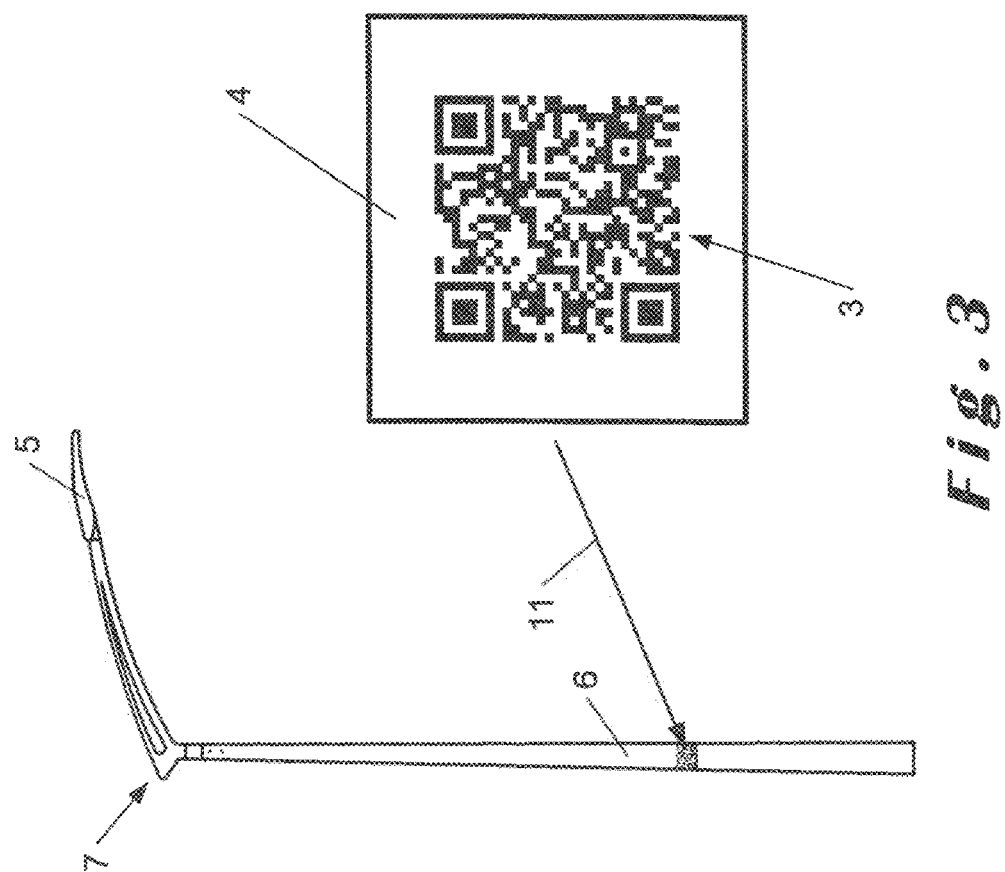
Figure 2:
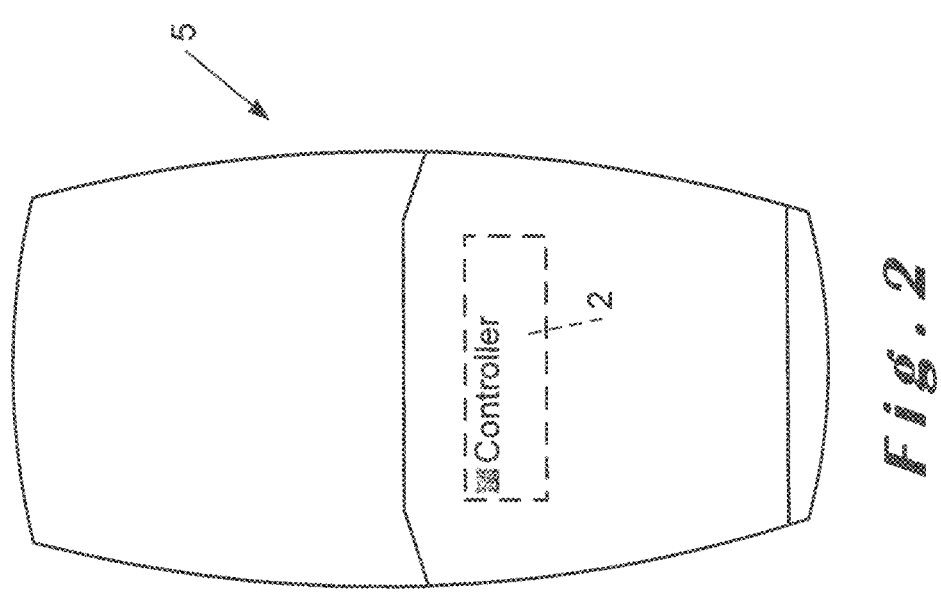
Figure 4:
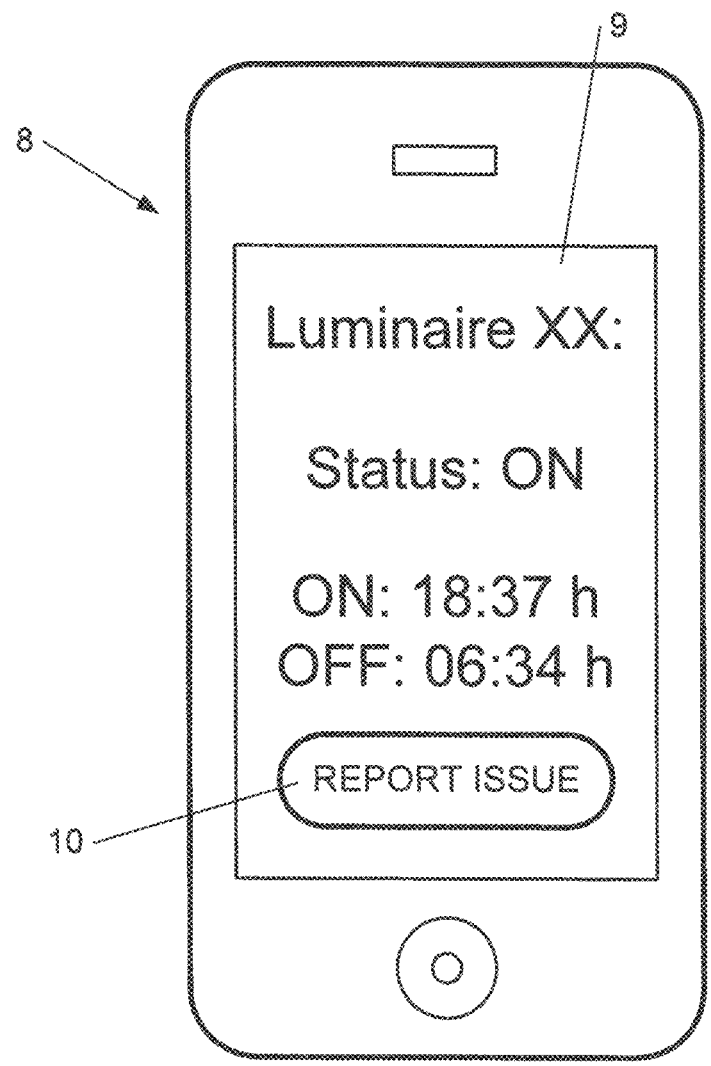

Further advantages and details of the invention can be found in the description of the figures that follows. In the illustrations:

FIG. 1 schematically shows a controller arrangement according to the invention,

FIG. 2 schematically shows a plan view of a luminaire according to the invention, FIG. 3 schematically shows a side view of the item shown in FIG. 2, FIG. 4 schematically shows a view of a software application that is part of the invention on a mobile terminal.

Single technical features of the exemplary embodiments described below can also be combined to form subject-matter according to the invention in combination with exemplary embodiments that are described above and also the features of the independent claims and any further claims. Where appropriate, elements that have the same functional effect are provided with identical symbols.

According to the invention, a controller 2 located in a packaging unit 1 is provided with a QR code 3. The same QR code 3 is also present on an information storage medium 4 that is enclosed with the controller 2 in the packaging unit 1, the information storage medium being in the form of a sticker (FIG. 1). In this way, the mark or information storage medium 4 effectively links the controller 2 with the luminaire which it is to control before the mark is added to the luminaire 7 (FIG. 3).

By using a QR code as the mark, it corresponds to the UID embedded in the controller as described above, or to a number that is derived from it using a known algorithm.

In the factory where the controllers are made and packaged into the packaging units, the stickers are printed with the QR code corresponding to the UID. As such, stickers including the mark are directly linked to the UID of the controller. The stickers are placed in the packaging unit with the controller, so that when the controller is to be installed inside a luminaire, one of the stickers can be put on the outside surface of the luminaire to provide a readily recognizable indication of the controller in the luminaire. In one embodiment, one sticker may be placed on the luminaire head and an additional sticker can be affixed to the pole or mast on which the luminaire head is mounted.

For the equipment of a large number of luminaires, a large number of such packaging units 1 is accordingly provided. Furthermore, the association of the controller 2 with a corresponding information storage medium 4, preferably in the form of a sticker, which takes place in automated fashion, needs to be communicated to at least one of the servers that controls the luminaire network that is to be equipped.

The term "luminaire" as used herein, on one hand, is intended to refer a luminaire head housing a light engine comprising illuminants or other light elements, the luminaire head being mounted either on a mast or pole or on a wall, façade or between walls etc.

During installation of a luminaire according to the invention, the controller 2 is integrated into a luminaire head 5 of a luminaire (as shown in FIG. 3) in the form of a traffic route luminaire, particularly a street luminaire. FIG. 2 shows the integrated controller 2 in dashed lines as the controller 2 is located within the luminaire head and is not visible from the outside thereof. Directly before or after the installation of the controller 2, i.e. during the same assembly or installation step in which the luminaire is provided with the luminaire head 5 or with the controller, the associated sticker 4 can be stuck onto a mast 6 of a luminaire 7 according to the invention, as shown in FIG. 3 as an enlarged detail, from which an arrow 11 points to the section that is actually located on the mast 6.

A passer-by or the installation team can use a software application that is in place on a mobile terminal 8 (as shown in FIG. 4) to scan in the QR code 3. Display area 9 of the mobile terminal 8 displays status information, e.g. when the luminaire is switched on or when it is switched off and also the current status. In the illustrated embodiment, the luminaire is switched on at 18:37 h (1837 (24-hour format) or 6.37 pm), switched off at 06:34 h (0634 (24-hour format) or 6.34 am), and the current status of the luminaire is ON.

Furthermore, there is an input panel 10 for reporting issues, which, when operated, calls up a mask, template or screen in which a selection of error messages are displayed which can be selected as required (not shown). A panel may also be called up for enabling the inputting further information.

Any information that is then input is transmitted, by linking to the luminaire-specific identification or the controller-specific identification (in the present case "XX" or as shown by the QR code) to a server that is at least jointly responsible for the operation of the luminaire network, and results in a prescribed action on that server to register more information or to resolve any issues.

The controller 2 is configured for controlling the operation of a light engine comprising one or more illuminant(s) or lighting element(s) in a luminaire 7 in accordance with a predetermined dimming profile which includes luminaire ON and luminaire OFF times which are adjusted in accordance with the seasons and the sunset and sunrise hours. Examples of ON and OFF times are described above with reference to FIG. 4.

As described above, the mark or sticker formed from an information storage medium 4 and associated with a controller 2 is utilised on at least one luminaire in a network of luminaires which is controlled by or via a server (not shown). It is important that the mark be positioned so that it is visually recognizable from the outside of the luminaire, e.g. on the mast 6 thereof.

Whilst it is preferred to have a QR code as the identifier on both the controller and the luminaire with which the controller is associated, it will be appreciated that other code types may be used.

The invention claimed is:

1. A method for marking a luminaire comprising a luminaire head having a luminaire head housing and a mast on which the luminaire head is mounted, the method comprising the steps of:
    associating a mark to at least one of the luminaire and a controller configured for controlling an operation of the luminaire, before installation of the controller at a site of the luminaire;
    producing at least one information storage medium that has or forms the mark, before installation of the controller at the site of the luminaire;
    installing the controller at the site of the luminaire;
    affixing the at least one information storage medium to at least one of the luminaire head housing and the mast;
    using the affixed at least one information storage medium and a mobile terminal configured for communicating with a server to sense by the mobile terminal or to input on the mobile terminal data relating to the mark;
    transmitting the sensed or input data to the server.

2. The method of claim 1, further comprising:
    receiving by the mobile terminal luminaire-specific information from the server in response to the transmitting; and
    displaying at least in part the luminaire-specific information on the mobile terminal.

3. The method of claim 1, wherein the affixing is performed directly before or after installation of the controller.

4. The method of claim 1, wherein the affixing is performed during assembling of the luminaire, said assembling comprising connecting the luminaire head to the mast.

5. The method of claim 1, wherein the affixing is performed during assembling or installing of the luminaire, said assembling or installing comprising providing the luminaire with the controller.

6. The method of claim 1, wherein the step of associating a mark is done at a factory.

7. The method of claim 1, wherein the method further comprises enclosing the at least one information storage medium with the controller in a packaging before the controller is installed in the luminaire.

8. The method of claim 1, wherein the luminaire head comprises a light engine comprising one or more lighting elements and the controller is configured for controlling the operation of the light engine in accordance with a dimming profile.

9. The method of claim 1, wherein the at least one information storage device comprises a sticker.

10. The method of claim 1, wherein the step of providing at least one information storage medium that has or forms the mark comprises forming a QR code on the information storage medium as the mark.

11. The method of claim 1, wherein the step of providing at least one information storage medium comprises providing a first information storage device intended to be affixed to the luminaire head and a second information storage device intended to be affixed to the mast.

12. The method of claim 1, further comprising linking the mark with a location of the luminaire using the server.

13. The method of claim 1, further comprising transmitting location and time information from the controller to the server, and linking the location information and the mark at the server.

14. The method of claim 1, further comprising the step of transmitting further information, in particular at least one of status and error information of the luminaire, by the mobile terminal to the server.

15. A method for obtaining information about a luminaire comprising a luminaire head having a luminaire head housing and a mast on which the luminaire head is mounted, the method comprising the following steps:
- affixing at least one information storage device to at least one of the luminaire head housing and the mast; said at least one information storage device having or forming a mark which is visually recognizable, the mark being linked with the luminaire in a data table on a server;
- sensing by a mobile terminal data relating to the mark from the affixed at least one information storage device,
- transmitting by the mobile terminal the sensed data to the server,
- receiving by the mobile terminal of luminaire-specific information from the server, and
- displaying by the mobile terminal at least part of the luminaire-specific information.

16. A method for obtaining information about a component of a luminaire comprising a luminaire head having a luminaire head housing and a mast on which the luminaire head is mounted, the method comprising the following steps:
- affixing at least one information storage device to at least one of the luminaire head housing and the mast; said at least one information storage device having or forming a mark which is visually recognizable, the mark being linked with the component in a data table on a server,
- sensing by a mobile terminal data relating to the mark from the affixed at least one information storage device;
- transmitting the sensed data to the server,
- receiving by the mobile terminal component-specific information from the server, and
- displaying by the mobile terminal at least part of the component-specific information.

* * * * *